Sept. 15, 1970

D. E. GARRETT 3,528,767

PRODUCTION OF POTASSIUM CHLORIDE, POTASSIUM SULFATE AND
SODIUM SULFATE FROM BRINES AND THE LIKE CONTAINING
POTASSIUM, CHLORIDE AND SULFATE

Filed March 16, 1966

INVENTOR
DONALD E. GARRETT
by: Wallenstein, Spangenberg,
Hattis & Strampel
ATTYS.

Sept. 15, 1970   D. E. GARRETT   3,528,767
PRODUCTION OF POTASSIUM CHLORIDE, POTASSIUM SULFATE AND
SODIUM SULFATE FROM BRINES AND THE LIKE CONTAINING
POTASSIUM, CHLORIDE AND SULFATE
Filed March 16, 1966   2 Sheets-Sheet 2
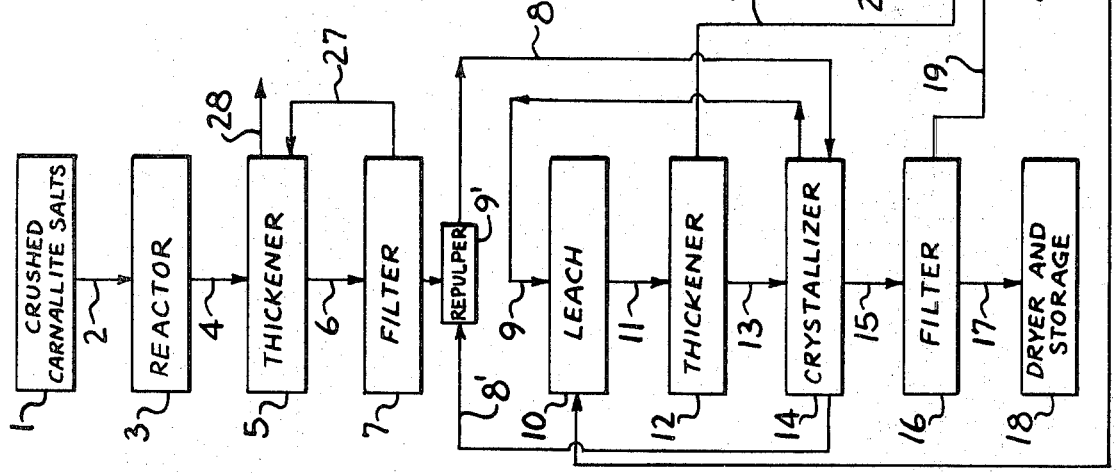
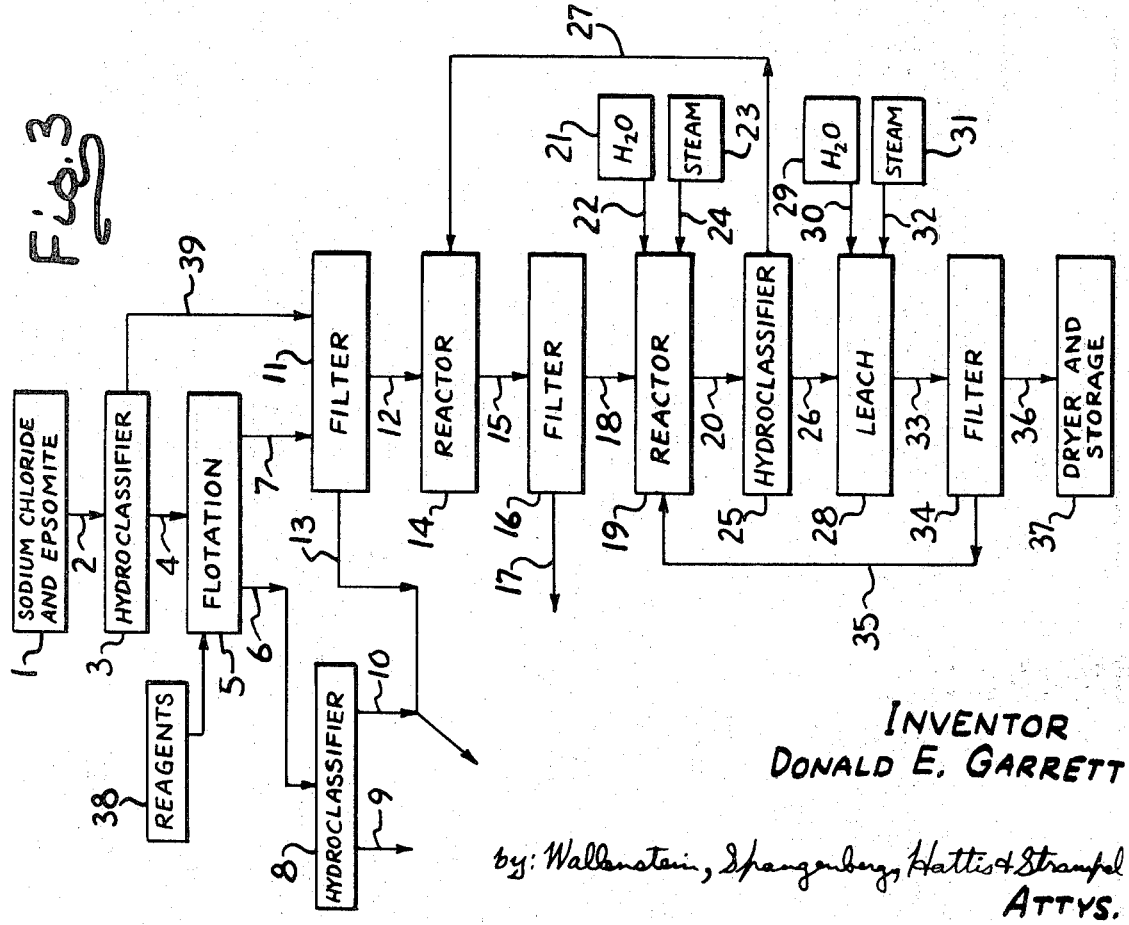
INVENTOR
DONALD E. GARRETT
by: Wallenstein, Spangenberg, Hattis & Strampel
ATTYS.

United States Patent Office 3,528,767
Patented Sept. 15, 1970

3,528,767
PRODUCTION OF POTASSIUM CHLORIDE, POTASSIUM SULFATE AND SODIUM SULFATE FROM BRINES AND THE LIKE CONTAINING POTASSIUM, CHLORIDE AND SULFATE
Donald E. Garrett, 505 W. 9th St.,
Claremont, Calif. 91711
Filed Mar. 16, 1966, Ser. No. 534,804
Int. Cl. C01d 3/06
U.S. Cl. 23—89                                13 Claims

ABSTRACT OF THE DISCLOSURE

Process for producing any one or more of potassium chloride, potassium sulfate, and sodium sulfate from raw salts obtained from brines containing potassium, chloride and sulfate, such as Great Salt Lake brine, comprising initially removing the major content of sodium chloride from said brine by evaporation and crystallization, then further evaporating the remaining brine to crystallize therefrom a raw salt mixture containing at least 20%, by weight, of carnallite and kainite, plus other salts including sodium chloride and epsomite or other magnesium sulfate hydrates, and then treating said raw salt mixture to recover or produce therefrom at least one of potassium chloride, potassium sulfate, and sodium sulfate, the potassium chloride, where recovered, being recovered from the carnallite, the potassium sulfate, where recovered, being recovered from the kainite or produced from the carnallite, and the sodium sulfate, where recovered, being produced from a salt mixture comprising the sodium chloride, and the epsomite or other magnesium sulfate hydrate.

---

Figure 2:
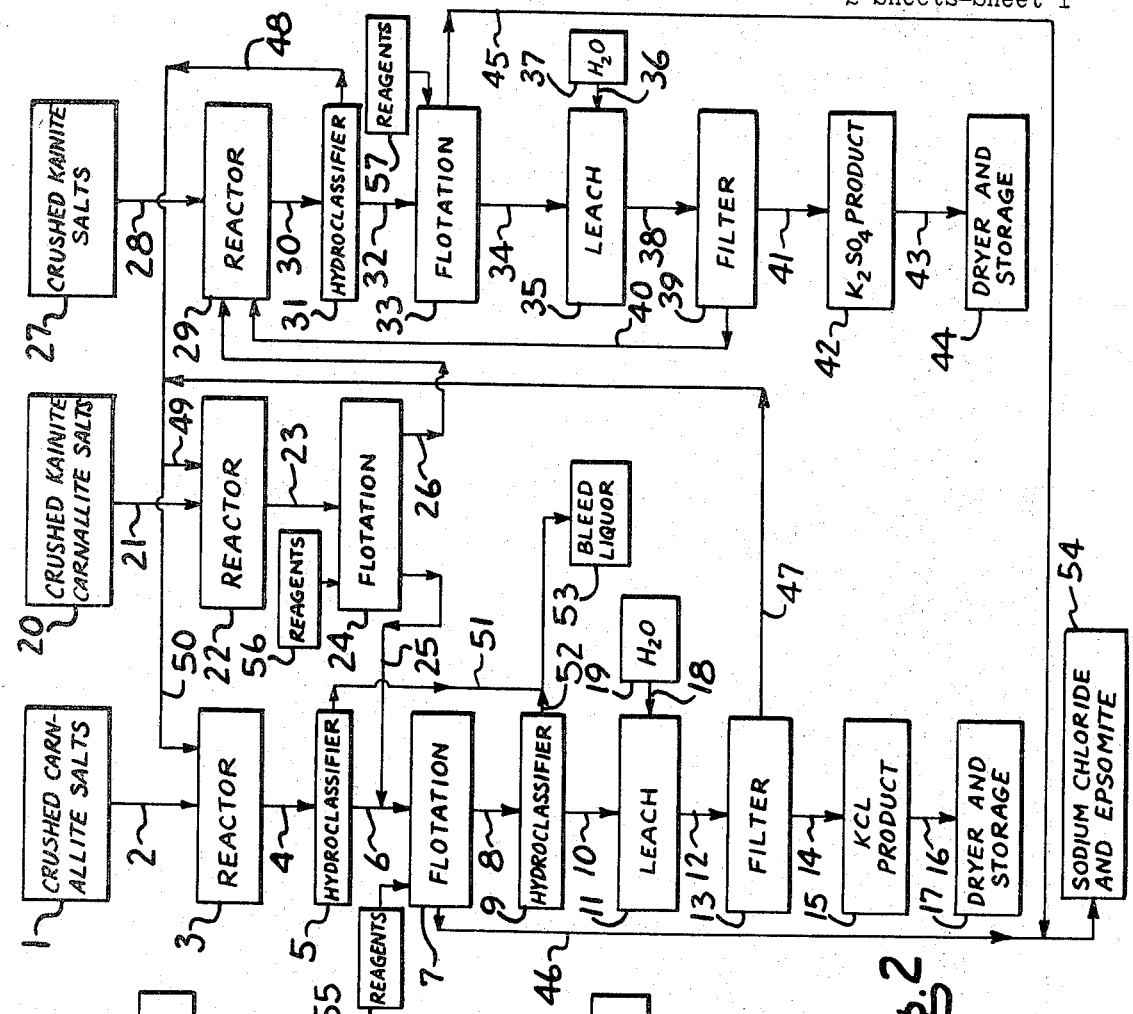

This invention relates to the production of potassium chloride, potassium sulfate, and sodium sulfate from brines and the like containing potassium, chloride and sulfate, notably from brines which, upon evaporation, deposit one or more of the potassium salts schoenite, leonite, langbeinite, kainite, carnallite and sylvite, and which brines or the like also contain sodium chloride, magnesium salts and other salts. While the procedures constituting my invention involve the utilization of some known conversion and processing steps, I have discovered an overall procedure not heretofore known which represents a significant, practical and economical total procedure.

Potassium salts formed during the evaporation of sulfatic potassium-containing brines, such as Great Salt Lake brine or sea water, contain exceedingly complex mixtures of potassium salts and other salts. These mixtures may include, for instance, schoenite, kainite, carnallite, glaserite, epsomite, astrakanite, salt and others. Variations in temperature and other climatic conditions may, upon evaporation of such brines, increase or decrease the complexity of the deposited salts, causing the formation of leonite, Glauber's salt, and various other salts.

Considerable research and effort has been devoted over a period of many years to the development of processing such complex salt mixtures to recover potassium chloride or potassium sulfate and other mineral values therefrom. Among such presently known procedures are those involving either extensive heating or cooling operations; others utilize the addition of various chemicals as, for instance, precipitations with calcium chloride, the formation of a so-called "lead syngenite" intermediate compound, and the utilization of organic chelating agents such as dipicrylamine. Such heretofore known procedures are, generally speaking, objectionable because of complexity in carrying them out or the high cost involved in the ultimate recovery of the desired mineral salt values. As a consequence of the complexity and expense of these procedures, there are essentially no large commercial operations in existence wherein potassium chloride and potassium sulfate are separately recovered and particularly where, also, salt cake is recovered as a part of an overall process. My invention provides a simpler and less costly procedure capable of processing these complex salt mixtures to yield any or all of potassium chloride, potassium sulfate, sodium sulfate, and other salts.

While my invention is especially useful in connection with the processing of Great Salt Lake brine, it is also applicable to the processing of generally similar brines or saline liquors which, upon evaporation, deposit double salts or potassium and magnesium, as, for instance, carnallite and kainite, in admixture with other salts including, for instance, sodium chloride, epsomite or other magnesium sulfate hydrates, and other salts as well. My invention will be described below in connection with the processing of Great Salt Lake brine but it will be understood that it is not limited thereto.

In the practice of my invention, broadly speaking, the raw brine is initially evaporated, particularly by solar evaporation, first to crystallize out the major content of the sodium chloride. The remaining brine is then further evaporated in a controlled manner to segregate roughly various potash salts. Thus, the raw brine may be evaporated in stages whereby to crystallize out first principally schoenite (commonly represented as

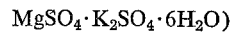

then principally kainite (commonly represented as

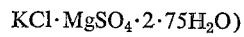

and finally principally carnallite (commonly represented as $KCl \cdot MgCl_2 \cdot 6H_2O$), said double salt products being roughly segregated from each other. Instead of forming such three fractions, as stated, it is frequently more desirable to segregate an initial fraction which contains largely the major proportion of the schoenite and kainite and a separate fraction which contains mainly the carnallite, with or without another fraction which contains intermediate proportions of schoenite, kainite and carnallite. In general, from a practical standpoint, it will usually be desirable to effect a rough segregation into two fractions, one which is rich in kainite (the kainite constituting at least 20% and, more desirably from about 35 to 75% of the solids in said fraction) and which will contain the major amount of such schoenite as may be present in the salts, and the other which is rich in carnallite (the carnallite constituting at least 20% and, more desirably, from about 35 to 75% of the solids in said fraction). Alternatively, in its broader aspects, although somewhat less advantageously, a single raw salt fraction which is rich in both kainite and carnallite is produced, which will usually also contain schoenite, can be prepared by evaporation of and crystallization from the concentrated brine after the initial removal of the sodium chloride from the starting brine as referred to above. Such carnallite-kainite rich fraction will contain a total of at least 20% of said salts and, more desirably, upwards thereof, particularly in the range of 40 to 60 or even up to about 75% of said salts based on the total solids in said fraction. In those instances in which the carnallite and the kainite are not segregated into separate rough fractions, but are present in a fraction in roughly the same proportions or in proportions in which the carnallite is from 80% or less than that of the kainite, it will ordinarily be economical to carry out the process to produce the potassium in the form of its sulfate.

In a typical sample of Great Salt Lake brine, the distribution of the potash in the main salts thereof may be considered to be roughly of the order of 60% kainite and 40% carnallite, and the content of potassium is about 0.6% based on the weight of the brine. After separating out the major amount of salt by initial evaporation and crystallization under a typical procedure of such type, the content of potassium in the remaining brine will have increase, for instance, to of the general order of 2.2%. In a typical carnallite-rich segregated salt fraction produced from said salt-reduced brine, the content of potassium will commonly be of the general order of 8%. After recovery of the potassium chloride and potassium sulfate, pursuant to the practice of my invention, as hereafter described, the content of potassium in what may be considered as the bitterns is commonly of the order of 0.2 to 0.4%.

The carnallite or carnallite-kainite rich fraction is decomposed separately to produce potassium chloride in a known manner, as shown, for instance, in Israel Pat. 10,603 or German Pat. No. 10,754. The crude mixture of salts resulting from this carnallite or carnallite-kainite decomposition can be treated by a one stage flotation procedure, as shown, for instance, in U.S. Pat. No. 2,968,525 or German Pat. No. 880,431; or by a two stage flotation procedure, as shown, for instance, in East German Pat. No. 25,076 or in Freibarger Forschung, A267, 113–116 (1953); or by other known procedures for separating solid potassium chloride from the sodium chloride, epsomite, and possibly kainite and other impurities. The sodium chloride and epsomite residue may then be treated, by known procedures, to produce salt cake, while the separated kainite, if present, is sent to the potassium sulfate circuit.

Figure 1:
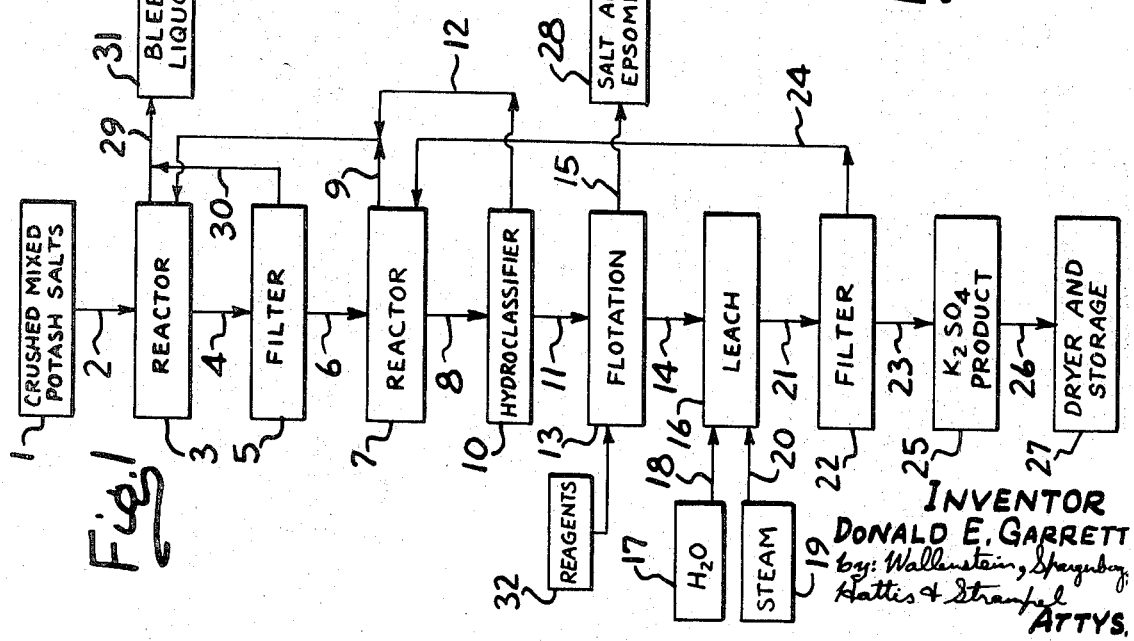

In FIG. 1, I show schematically or diagrammatically the application of my invention to the production of potassium sulfate. The potash salts, harvested from solar evaporation ponds, are crushed by known means. The crushed mixed potash salts 1 are admitted by line 2 to a reactor 3. A mother liquor from a succeeding process step is fed to the reactor 3 by line 9. Such mother liquor will commonly comprise an aqueous solution containing of the general order of 4% sodium chloride, 5% potassium chloride, 16% magnesium chloride, 6% magnesium sulfate, by weight, balance mainly water together with small proportions of other salts. The reactants are mixed and agitated at a temperature preferably in the range of about 20 to 30° C. or somewhat above until the carnallite and epsomite in the mixed salts react to form kainite. After this reaction, the potassium in the mixed salts is primarily in the form of kainite, with perhaps some schoenite and other salts. End brine from the reaction is removed by line 29 and becomes a bleed liquor 31 which may either be discarded or recycled to the solar evaporation ponds. Solid products and end brine are taken from the reactor 3 by line 4 to filter 5. This filter may be a centrifuge or other common filtering device. The end brine from the filter is taken by line 30 to join line 29 and is bleed liquor 31 from the process. Solids from the filter 5 are taken by line 6 to reactor 7 where they are mixed with a mother liquor 24 from a succeeding process step. A typical mother liquor 24 will have of the general order of 17% magnesium sulfate, 15% potassium sulfate and the remainder mainly water with small proportions of other salts. Agitation is used to keep the reactants well mixed, and at a temperature of about 30° C. the kainite is converted to schoenite in a per se known manner. Overflow liquor from the reactor 7 becomes the mother liquor for the preceding carnallite reaction, and is carried by line 9 to reactor 3 as stated above.

Solids and the major part of liquor from the reactor 7 are taken by line 8 to a hydroclassifier 10. The hydroclassifier separates an essentially solid-free overflow liquor, which is taken by line 12 to join line 9 as mother liquor for transfer to reactor 3, from the underflow which contains essentially all of the solids from reactor 7 and some liquor from the reaction. The underflow solids, which are primarily schoenite, halite and epsomite, are carried by line 11 to a flotation cell 13. Suitable flotation reagents 32, as shown, for instance, in German Pat. No. 945,622, Italian Pat. No. 573,975, and in J. Applied Chem., U.S.S.R. 12, 836–843 (1939), are added to the slurry and a flotation is effected to separate the schoenite from the sodium chloride, epsomite and other impurities. The sodium chloride and the epsomite are primarily in the underflow which is removed by line 15, and the mixture of sodium chloride and epsomite 28 is sent to another part of the process. The overflow from the flotation containing essentially schoenite, with small amounts of sodium chloride and epsomite, is taken by line 14 to a leach tank 16.

Water 17 is admitted by line 18 and steam 19, to provide heat for the leaching operation (see, for instance, U.S. Pats. Nos. 1,939,174 and 3,809,093 and Italian Pat. No. 559,074), is admitted by line 20 to the leach tank. Agitation is provided, and, after a sufficient time at a temperature usually between 40° C. and 60° C., essentially all of the schoenite is leached, leaving solid potassium sulfate and a liquor containing magnesium sulfate, potassium sulfate, and small amounts of sodium chloride and other impurities. The water and steam added to this reaction are desirably and readily controlled to allow an efficient recovery of essentially pure potassium sulfate.

Solids and leach liquor are carried by line 21 to a filter 22, where a centrifuge or other filtering device separates the solid potassium sulfate from the liquor, the latter then being taken by line 24 to reactor 7 to be used as the mother liquor for reaction in said reactor. The solid is taken from the filter by line 23 as a potassium sulfate product 25. This product may be carried by line 26 to a dryer and storage setup 27.

In FIG. 2, I show schematically or diagrammatically the application of my invention to the production of potassium sulfate and potassium chloride. As previously described, the potash salts in the raw or starting brine are first roughly segregated, preferably in solar ponds, in three parts, a first one containing potassium principally as carnallite, a second one containing potassium principally as kainite, and a third one containing both carnallite and kainite, each of said fractions also containing sodium chloride, epsomite and other impurities.

The first or carnallite fraction is crushed by known means. The crushed carnallite fraction 1 is carried by line 2 to a decomposition reactor 3 where the carnallite is mixed and agitated with water or, preferably, a mother liquor 50 (which, commonly, may have a composition generally similar to that of mother liquor 9 of FIG. 1 or which may contain any one or more of sodium chloride, potassium chloride, magnesium chloride and magnesium sulfate) to decompose the carnallite to potassium chloride in a known manner, as shown, for instance, by the aforementioned Israel Pat. No. 10,603 and German Pat. No. 10.754. The products of the reaction are carried by line 4 to a hydroclassifier 5. The overflow, containing essentially only liquor, is taken by line 51 where it is bleed liquor 53 from the process. The underflow, containing essentially all of the solids from the carnallite decomposition and some liquor, is carried by line 6 to a flotation cell 7. Conventional flotation reagents 55 are added and flotation is carried out in known manner to float the potassium chloride from the sodium chloride, epsomite and other solids. The sodium chloride and epsomite underflow 54 are taken by line 46 to another part of the process and the potassium chloride overflow is taken by line 8 to a hydroclassifier 9 where some liquor is removed as an overflow 52 to become bleed liquor 53. The underflow, containing potassium chloride, small amounts of impurities and brine, is taken by line 10 to leach tank 11 where water 19 is added by line 18, the leach tank is agitated and impurities are dissolved leaving essentially only solid potassium chloride. Only enough water to remove impurities is added. Line 12 carries solid and liquor to filter 13, where, by a centrifuge or other means, the liquor is separated from the solid. The liquor is carried by line 47 to be used as part of the mother liquor for the carnallite decomposition in reactor 3. The solid potassium chloride product 15 leaves the filtering device by line 14 and may be sent by line 16 to a dryer and storage setup 17.

The second fraction of the harvested salts, containing both kainite and carnallite, is crushed by conventional means and the crushed salts 20 are carried by line 21 to a carnallite decomposition reactor 22, similar to reactor 3. Mother liquor 49 is added and the reactants are agitated. The kainite in the entering salts does not react appreciably and is withdrawn along with the potassium chloride and impurities by line 23. Flotation reagents 56 are added to the flotation cell 24, and a flotation is carried out to separate potassium chloride, which is taken by line 25 to join line 6 for further processing, from other solids which are taken by line 26 to reactor 29.

The third fraction of salts which, as noted above, contains kainite, is crushed, and the crushed raw salts 27 are taken by line 28 to reactor 29. Water, but preferably a mother liquor 40 (generally similar to mother liquor 24 of FIG. 1), is admitted to the reactor 29 and reacts with the solids to convert the kainite to schoenite in a manner known to the art as shown, for instance, in German Pat. No. 10,754; Italian Pats. Nos. 559,074, 628,215, and 641,271; and U.S. Pats. Nos. 229,249 and 2,902,344. Product solids and liquor are withdrawn by line 30 to a hydroclassifier 31. The overflow liquor passing through line 48 becomes the mother liquor for the reactions in reactors 3 and 22. The underflow, containing essentially all of the solids, is carried by line 32 to flotation cell 33 where it is mixed with conventional flotation reagents 57. The flotation separates schoenite as an overflow from sodium chloride and epsomite as an underflow, said underflow being carried by line 45 to another part of the process. The schoenite overflow, which contains small amounts of sodium chloride and epsomite impurities, is carried by line 34 to leach tank 35. Water 37, some of which may be in the form of steam, is carried by line 36 to the leach tank where agitation is effected to bring about full reaction. In place of water, an aqueous solution of potassium chloride can be added to the schoenite. This known reaction, as referred to above, yields essentially pure solid potassium sulfate and a liquor which are taken by line 38 to filter 39. By means of a centrifuge or other filtering device, the liquor is removed and is carried by line 40 to be used as the mother liquor for reaction in the reactor 29. The solid potassium sulfate product 42 leaves the filter by line 41 and may be sent by line 43 to a dryer and storage setup 44.

Instead of treating the second and third fractions separately, as described above, the third fraction, as well as the second and third fractions combined, can be treated in the manner described above with respect to the second fraction.

It will be noted that, in the procedures described above, a mixture of sodium chloride and epsomite was also recovered (28 in FIG. 1 and 54 in FIG. 2). The production of salt cake from such mixtures, if such could be effected economically, is of importance, particularly as a part of an overall process of recovering mineral salt values from brines. While the principles of reacting sodium chloride and epsomite to form astrakanite (commonly represented as $Na_2SO_4 \cdot MgSO_4 \cdot 4H_2O$) which, in turn, can be reacted with an appropriate liquor to form salt cake, are broadly known (Kali u. Steinsalz, 3, pp. 85–97, September 1960, and Russian Jour. of Inorg. Chem., 9, 1426 (1964)), so far as I am aware, no practical commercial process has been devised or put into practice.

In FIG. 3, I show schematically or diagrammatically a procedure for effecting, commercially and economically, the recovery of salt cake from a mixture of sodium chloride and epsomite such as is produced when my invention has heretofore described is practiced or which is produced or available from other sources.

The sodium chloride and epsomite mixture, which is first made into a flowable slurry with a process brine, is passed from a source 1 through line 2 to a hydroclassifier 3 where a size separation is made, with the overflow, consisting primarily of sodium chloride, being sent forward in the process by line 39. If necessary to obtain a fraction containing predetermined amounts of epsomite and sodium chloride, the underflow, containing both sodium chloride and epsomite, is taken by line 4 to a flotation cell 5, and flotation reagents 38 are added. Diversion of some sodium chloride by the hydroclassifier 3 can effect economy in the flotation step both by lowering the consumption of reagents and by reducing the size of the equipment. The flotation separates the sodium chloride from the epsomite with the sodium chloride taken by line 6 to hydroclassifier 8. The underflow 9 from the hydroclassifier is sodium chloride and brine, which is removed from the process, and the overflow brine, essentially free of solids, is removed from the process by line 10, to be reused as a carrier for more sodium chloride and epsomite entering the process. The epsomite fraction from the flotation is taken by line 7 to filter 11. The sodium chloride from hydroclassifier 3 is carried by line 39 to filter 11. The sodium chloride and epsomite entering filter 11 are controlled to obtain suitable proportions, for example, of the order of 60% epsomite and 40% sodium chloride plus minor proportions of impurities, for subsequent reaction in reactor 14.

A centrifuge or other filtering device removes brine, which is carried by line 13 to join line 10 and used to carry raw salt and epsomite to the process, from solid sodium chloride and epsomite which are carried by line 12 to reactor 14. Water, or preferably, a mother liquor 27 (which may, for instance, have a composition of the general order of 8% magnesium sulfate, 21% sodium chloride, about 0.5% sodium sulfate and the remainder water with small amounts of other salts) is added, and, after sufficient time in the agitated reactor 14, sodium chloride and epsomite are converted to astrakanite. The reaction products are carried by line 15 to filter 16 which may be a vacuum rotary pan filter or other filtering device, which separates a brine 17, which is returned to solar evaporation ponds or discarded, from the astrakanite solids which are carried by line 18 to reactor 19. Water or, preferably, another liquor 35 (which may, for instance, comprise generally about 5% magnesium sulfate, 10% sodium sulfate, 14% sodium chloride and the remainder mainly water plus small amounts of other salts) is added, and also water 21 and steam 23 are admitted to the reactor by lines 22 and 24, respectively. The reactor 19 is agitated and maintained at a sufficient temperature (about 35° C.) to convert the astrakanite to salt cake.

The reaction products are carried by line 20 to a hydroclassifier 25. The essentially solid-free brine overflow is carried by line 27 to become the mother liquor for reactor 14. The underflow, containing salt cake and impurities as well as liquor, is taken by line 26 to leach tank 28. Water 29 and steam 31 are added by lines 30 and 32, respectively, to this agitated leach tank. The impurities are dissolved, along with some salt cake, leaking a solid which is essentially pure salt cake. Reaction products are removed from the reactor by line 33 and sent to filter 34. A vacuum rotary pan filter or other filtering device separates the products into a brine and solids. The brine is taken by line 35 to become the mother liquor for reaction in reactor 19. The solid salt cake is taken by line 36 to a dryer and storage setup 37.

The interrelation of the various flow streams in the overall process of my invention, as illustrated in FIGS. 1 and 2, permits various alternative procedures to be carried out. In FIG. 4, one of such alternative procedures is shown schematically or diagrammatically. Thus, raw crushed carnallite salts 1, such as the first fraction utilized as described in connection with FIG. 2, are taken by line 2 to a decomposition reactor 3. A mother liquor from another part of the process (e.g. from line 48 of FIG. 2) is added to the agitated decomposition reactor 3 where the carnallite is decomposed to potassium chloride. The reaction products are taken by line 4 to a thickener 5, where solids are concentrated. The overflow liquor from the thickener is removed by line 28 to be returned to evaporators or solar evaporation ponds or discarded, while the thickened solids are taken by line 6 to a filter 7. A tilting-pan vacuum filter or other filtering device separates liquor, which is taken by line 27 to thickener 5. The crude potassium chloride solid is repulped in a repulper 9' with a liquor 8' from the crystallizer 14 and taken by line 8 through the condenser of the crystallizer 14. This step, while not necessary, is advantageous in improving the heat recovery of the crystallization operation.

The crude potassium chloride slurry is then carried by line 9 to a steam-heated leach tank 10 provided with an agitator. A liquor stream 21 which, for instance, may have a composition comprising of the general order of 4% sodium chloride, 8% potassium chloride, 13% magnesium chloride, 6% magnesium sulfate, and the remainder essentially water plus small proportions of other salts, is also admitted to the agitated, steam-heated leach tank. The crude potassium chloride is dissolved, while most impurities are not dissolved. The solids and liquor from the leach tank pass by line 11 to thickener 12. The solids are settled in this thickener, producing a potassium chloride-rich, essentially solid-free liquor overflow, which is taken by line 13 to the crystallizer 14. The underflow slurry from thickener 12 is taken by line 26 to thickener 20.

The potassium chloride-rich liquor is cooled in the crystallizer 14 in a controlled manner to crystallize solid potassium chloride (see Eng. and Min. J., 166, No. 10, 84 (October 1965)). The sold potassium chloride and liquor are taken by line 15 to filter 16. A centrifuge or other filtering means is used to separate solid potassium chloride from the liquor which latter is taken by line 19 to thickener 20. Thickener 20 provides thickening for impurity solids and additional time for potash values to dissolve. The overflow from thickener 20 is returned by line 21 to to the leach tank 10 while the underflow solids are sent to a tailings filter 23. A tilting-pan vacuum filter or other filtering device separates the liquor, which is returned by line 24 to thickener 20, from solids which are sent to waste by line 25. The potassium chloride product is taken from filter 16 by line 17 from where it can be sent to a dryer and storage setup 18.

Another alternative mode of procedure, which may be carried out where it is desired, for instance, to increase the amount of potassium sulfate in relation to the potassium chloride, makes use of the known metathesis reaction between potassium chloride and schoenite to produce potassium sulfate in a higher yield than can be obtained from schoenite alone (see Ind. Eng. Chem., 39, 43 (1947); and German Pat. No. 1,145,156). Thus, this may be accomplished, in relation to the setup of FIG. 2, by directing a portion of the potassium chloride from line 16 to leach tank 35. The metathesis reaction takes place in the tank 35, producing solid potassium sulfate and a liquor. These products are taken by line 38 to filter 39 where the liquor is separated and taken by line 40 as the mother liquor for reaction in reactor 29. The improved yield of potassium sulfate 42 is taken from the filtering device by line 41. By this means the quantity of potassium sulfate produced may be varied over wide limits.

I claim:

1. A process for producing at least one salt selected from the group consisting of potassium chloride, potassium sulfate, and sodium sulfate from raw salts obtained from brines containing sodium, potassium, magnesium, chloride and sulfate ions, which comprises initially removing the major content of sodium chloride from said brine by evaporation and crystallization, then further evaporating the remaining brine to crystallize therefrom a raw salt mixture containing at least 20%, by weight, of carnallite and kainite, plus other salts including sodium chloride and magnesium sulfate hydrates, and then reacting said raw salt mixture to obtain therefrom at least one of potassium chloride, potassium sulfate, and sodium sulfate.

2. A process according to claim 1, wherein the brines are Great Salt Lake brines and wherein evaporations are conducted in solar ponds.

3. A process according to claim 2, wherein said raw salt mixture is produced by controlled evaporation and crystallization in the form of roughly segregated fractions comprising (a) a fraction containing potassium salts principally as carnallite, (b) a fraction containing potassium salts principally as kainite, and (c) a fraction containing potassium salts principally as a mixture of carnallite and kainite, each of said fractions also containing sodium chloirde and magnesium sulfate hydrates, and then reacting said segregated fractions to recover potassium chloride from the carnallite fraction and potassium sulfate from the kainite fraction.

4. A process according to claim 3, which also includes the step of reacting a mixture of the sodium chloride and the magnesium sulfate hydrate to produce sodium sulfate therefrom.

5. A process according to claim 1, wherein said raw salt mixture is produced by controlled evaporation and crystallization in the form of roughly segregated fractions comprising (a) fraction containing potassium salts principally as carnallite and (b) a fraction containing potassium salts principally as kainite, the potassium salt content in each of said fractions being at least 20% of the solids contents of said fractions, each of said fractions also containing sodium chloride and magnesium sulfate hydrates, and then reacting said segregated fractions to recover potassium chloride from the carnallite fraction and potassium sulfate from the kainite fraction.

6. A process according to claim 5, which also includes the step of reacting a mixture of the sodium chloride and the magnesium sulfate hydrate to produce sodium sulfate therefrom.

7. A process according to claim 1, which includes the step of reacting the carnallite to obtain potassium chloride therefrom.

8. A process according to claim 1, which includes the step of reacting the kainite to obtain potassium sulfate therefrom.

9. A process according to claim 1, which includes the step of reacting the carnallite to obtain potassium sulfate therefrom.

10. A process according to claim 1, which includes the step of reacting the carnallite to obtain potassum sulfate therefrom.

11. A process for producing potassium sulfate from Great Salt Lake brine, which contains sodium, potassium, magnesium, chloride and sulfate ions, which comprises initially removing the major content of sodium chloride from said brine by evaporation and crystallization, then further evaporating the remaining brine in controlled stages to crystallize therefrom raw salt mixtures in the form of roughly segregated fraction comprising (a) a fraction containing potassium salt principal as carnallite, (b) a fraction containing potassium salts principally as kainite, and (c) a fraction containing potassium salts principally as a mixture of carnallite and kainite, each of said fraction also containing sodium chloride and magnesium sulfate hydrates, reacting at least one of the (b) and (c) fractions with a mother liquor to decompose the carnallite and leave the kainite essentially unreacted, said mother liquor comprising an aqueous solution containing sodium chloride, potassium chloride, magnesium chloride and magnesium sulfate and being recovered from a succeeding step in the process, removing the solids, separating the potassium chloride from the kainite in said solids, reacting the kainite solids with a mother liquor to convert the kainite to schoenite, said mother liquor comprising an aqueous solution containing magnesium sulfate and potassium sulfate and being recovered from a succeeding step in the process, hydroclassifying the schoenite solids and the major part of the liquor of said reaction mixture to produce underflow solids comprising primarily schoenite, halite and magnesium sulfate hydrate, subjecting said underflow solids to flotation to effect separation of the schoenite, treating said schoenite by a procedure selected from the group consisting of (i) leaching it with water and (ii) adding potassium chloride thereto whereby to leave solid potassium sulfate, and recovering said solid potassium sulfate, the liquor from said recovery step being utilized to convert kainite to schoenite as previously recited.

12. A process for producing both potassium sulfate and potassium chloride from Great Salt Lake brine, which contains sodium, potassium, magnesium, chloride and sulfate ions, which comprises initially removing the major content of sodium chloride from said brine by evaporation and crystallization, then further evaporating the remaining brine in controlled stages to crystallize therefrom raw salt mixtures in the form of roughly segregated fractions comprising (a) a fraction containing potassium salts principally as carnallite, (b) a fraction containing potassium salts principally as kainite, and (c) a fraction containing potassium salts principally as a mixture of carnallite and kainite, each of said fractions also containing sodium chloride and magnesium sulfate dihydrates, reacting the (a) fraction with a member selected from the group consisting of water and mother liquor to convert the carnallite to potassium chloride, said mother liquor comprising an aqueous solution containing at least one salt selected from the group consisting of sodium chloride, potassium chloride, magnesium chloride and magnesium sulfate and being recovered from a succeeding step in the process, hydroclassifying the reacted mixture to produce an underflow containing essentially all of the solids from the carnallite decomposition and some liquor, subjecting said underflow solids to flotation to effect separation of potassium chloride; admixing the (b) fraction with a mother liquor to convert the kainite to schoenite, said mother liquor comprising an aqueous solution containing magnesium sulfate and potassium sulfate and being recovered from a succeeding step in the process, hydroclassifying said reacted mixture to produce an underflow containing essentially all of the solids, subjecting said underflow solids to flotation to effect separation of the schoenite, treating said schoenite by a procedure selected from the group consisting of (i) leaching it with water and (ii) adding potassium chloride whereby to convert the schoenite to solid potassium sulfate, the liquor from said recovery step being utilized to convert kainite to schoenite as previously recited; admixing the (c) fraction with a member selected from the group consisting of water and a mother liquor to decompose the carnallite to potassium chloride, said mother liquor comprising an aqueous solution containing sodium chloride, potassium chloride, magnesium chloride and magnesium sulfate and being recovered from another step in the process, and subjecting reacted mixture to flotation to effect separation of the potassium chloride.

13. A process for producing salt cake from Great Salt Lake brine, which contains sodium, potassium, magnesium, chloride and sulfate ions, which comprises initially removing the major content of sodium chloride from said brine by evaporation and crystallization, then further evaporating the remaining brine in controlled stages to crystallize therefrom raw salt mixtures in the form of roughly segregated fractions comprising (a) a fraction containing potassium salts principally as carnallite, (b) a fraction containing potassium salts principally as kainite, and (c) a fraction containing potassium salts principally as a mixture of carnallite and kainite, each of said fractions also containing sodium chloride and magnesium sulfate hydrates, subjecting at least one of said fractions to flotation to obtain a fraction containing predetermined amounts of magnesium sulfate hydrate and sodium chloride, reacting said fraction with a member selected from the group consisting of water and a mother liquor to bring about conversion to solid astrakanite, said mother liquor comprising an aqueous solution containing magnesium sulfate, sodium chloride and sodium sulfate and being recovered from a succeeding step in the process, separating the solid astrakanite, and then reacting it with a member selected from the group consisting of water and a mother liquor to convert the astrakanite to salt cake, said last-mentioned mother liquor comprising an aqueous solution containing magnesium sulfate, sodium sulfate and sodium chloride and being recovered from a succeeding step in the process.

References Cited
UNITED STATES PATENTS

| | | | |
|---|---|---|---|
| 2,479,001 | 8/1949 | Burke et al. | 23—89 XR |
| 2,952,515 | 9/1960 | Dancy | 23—121 |
| 3,003,849 | 10/1961 | Veronica | 23—128 XR |
| 3,004,826 | 10/1961 | Marullo et al. | 23—128 XR |
| 3,058,806 | 10/1962 | Ebner | 23—121 |
| 3,082,063 | 3/1963 | Cevidalli et al. | 23—89 XR |
| 3,099,528 | 7/1963 | Hadzeriga | 23—89 |
| 3,110,561 | 11/1963 | Henne et al. | 23—121 |
| 3,198,601 | 8/1965 | Veronica et al. | 23—128 |
| 3,207,576 | 9/1965 | Marullo et al. | 23—128 |
| 3,243,259 | 3/1966 | Stein et al. | 23—121 |
| 3,268,289 | 8/1966 | Macey | 23—89 |
| 3,342,548 | 9/1967 | Macey | 23—89 |

EDWARD STERN, Primary Examiner

U.S. Cl. X.R.

23—38, 42, 91, 117, 121, 128